United States Patent
Webb

[15] 3,680,673
[45] Aug. 1, 1972

[54] CLUTCHES
[72] Inventor: Oswald Webb, Whitley, England
[73] Assignee: Harry Ferguson Research Limited
[22] Filed: Oct. 21, 1970
[21] Appl. No.: 82,665

[30] Foreign Application Priority Data
Oct. 22, 1969 Great Britain.............51,666/69

[52] U.S. Cl......................192/41, 192/12 B, 192/54
[51] Int. Cl..............................................F16d 13/04
[58] Field of Search....................192/12 B, 54, 41, 52

[56] References Cited
UNITED STATES PATENTS
2,915,156  12/1959  Horn..............................192/41
3,477,302  11/1969  Webb..........................192/12 B
3,118,292  1/1964  Schröter et al. ................192/54

Primary Examiner—William F. O'Dea
Assistant Examiner—Randall Heald
Attorney—Mason, Fenwick & Lawrence

[57] ABSTRACT

Various embodiments of overrunning clutches are described. Each clutch is of the type which incorporates mutually interleaved friction plates; and mutually separable annular pressure plates connected respectively to driving and driven members and having between them actuating means in the form of ball-and-ramp actuators which are sensitive to the direction of relative rotation of the pressure plates and consequently of the driving and driven members. In order to improve the sensitivity of the clutch, the pressure plates are lightly spring biassed by springs which act on the pressure plates in opposite circumferential directions which correspond with a tendency for the pressure plates to separate. The springs place the clutch in a pre-loaded condition and so improve the sensitivity, and also take up wear which may occur in the friction plates or pressure plates. Embodiments incorporating both tension and compression spring are described.

6 Claims, 7 Drawing Figures

Inventor
OSWALD WEBB
By Mason, Fenwick & Lawrence
Attorneys

Inventor
OSWALD WEBB
By
Mason, Fenwick & Lawrence
Attorneys

Inventor
OSWALD WEBB
By
Mason, Fenwick & Lawrence
Attorneys

CLUTCHES

This invention relates to overrunning clutches.

More particularly, the invention is concerned with such overrunning clutches which permit the driven member to overrun the driving member at least in one direction of rotation, and which incorporate a fraction clutch arranged mechanically in series with means sensitive to the relative direction of rotation of the members with respect to one another and adapted so as to very torsional capacity of the friction clutch in accordance with changes in the said relative direction of rotation. Thus, during drive, torsional capacity of the friction clutch is increased whereas, during overrun, torsional capacity of the friction clutch is reduced and the clutch slips.

According to the present invention there is provided an overrunning clutch comprising rotatable driving and driven members, drive means operatively interposed between the driving and driven members, the said means including a first pressure plate, connecting means for establishing a driving connection between the driving member and the first pressure plate, a shiftable second pressure plate, a friction clutch of variable torsional capacity between the driven member and the shiftable pressure plate for establishing a driving connection between the driven member and the shiftable pressure plate, the said pressure plates having mutually co-operable camming means thereon for forcing the pressure plates apart and consequently increasing torsional capacity of the friction clutch when the driving and driven members and consequently the pressure plates tend to rotate relatively with respect to one another in one relative direction, a casing surrounding the said drive means and rotatable about the axis of the overrunning clutch, second connecting means placing the casing in diving connection with the shiftable pressure plate, and a spring acting on the pressure plates so as to tend to rotate the plates relatively with respect to one another in the said one relative direction, said spring having one end thereof connected to the first pressure plate and the other end thereof anchored to the casing. The present invention is also an improvement in or modification of the invention set forth in the complete specification of our British Pat. No. 1,185,043; and at the same time is an improvement in or modification of the invention set forth in the complete specification of our British Pat. No. 35365/68.

Embodiments of the present invention will now be described, by way of example, with reference to the drawings in which.

Figure 1:
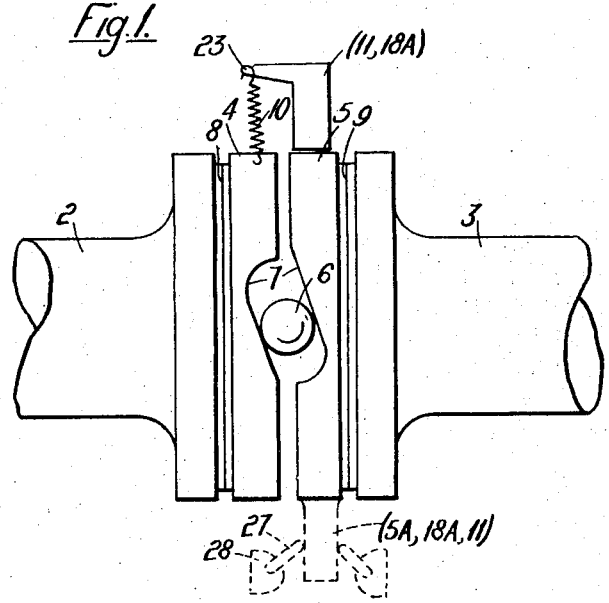
FIG. 1 is a diagrammatic representation of an overrunning clutch in accordance with the present invention.
Figure 2:
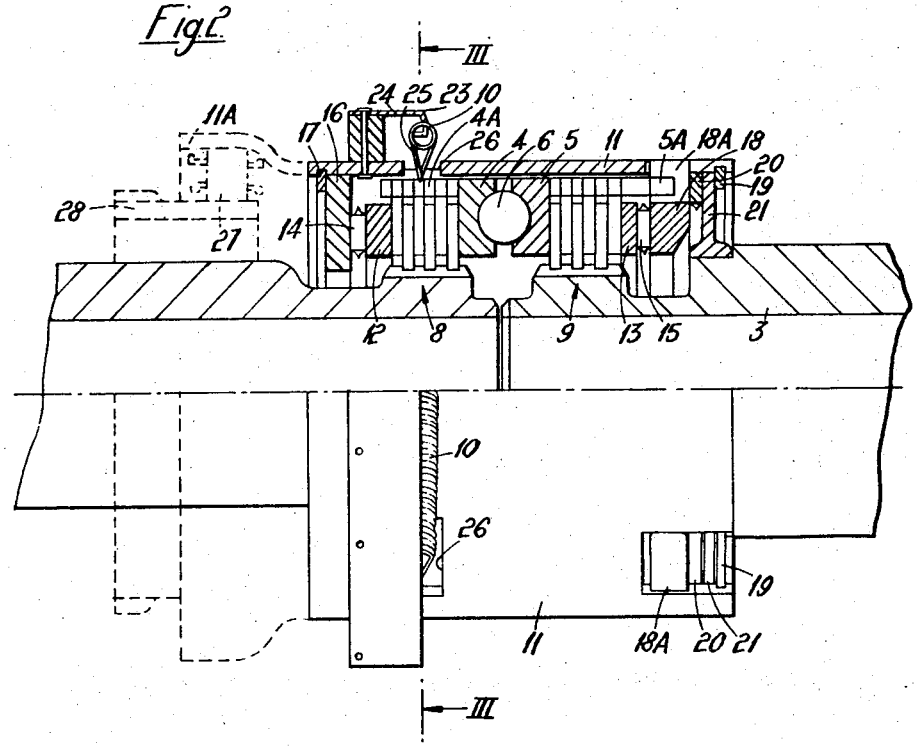
FIG. 2 is a part-sectional side elevation of a practical embodiment of the overrunning clutch of FIG. 1.

THe broken outlines in FIGS. 1 and 2 show a modification of the full line drawings such as to render FIGS. 1 and 2 similar to FIGS. 1 and 2 of our British Pat. No. 1,185,043 modified in accordance with the resent invention.

Reference has been made above to our British Pat. Nos. 1,185,045 and 1,236,981. and it is to be understood that such reference is intended to impart into this specification the entire disclosure of the complete specifications of these earlier proposals.

Figure 3:
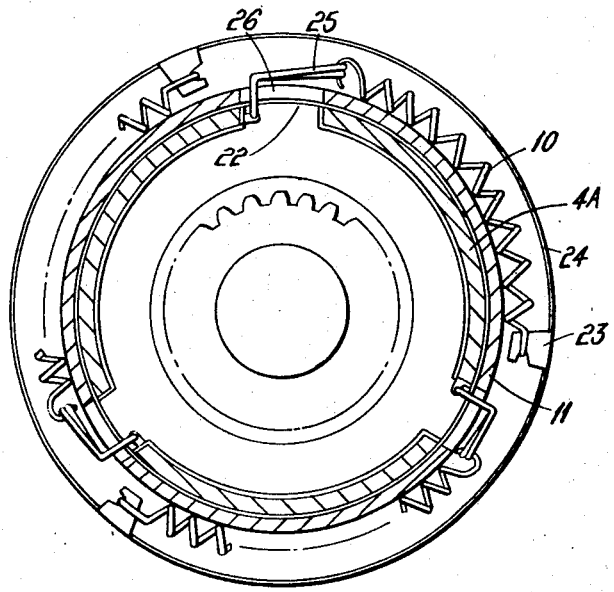
FIG. 3 is a sectional end view on the line III-III in FIG. 2.

In FIGS. 2 and 3 of the drawings, ignoring for the moment the broken outlines in FIG. 2, an overrunning clutch in accordance with the present invention consists of rotatable driving and driven members in the form of tubular shafts 2 and 3 respectively, mutually opposed first and second axially shiftable pressure plates 4 and 5 having camming means in the form of balls 6 (only one ball is shown in FIG. 2) which are received in circumferentially arranged ramped grooves 7, (see FIG. 1) friction clutches 8 and 9 in the form of sets of interleaved friction plates and tension springs 10 arranged so as to tend to rotate the pressure plates 4 and 5 relatively with respect to one another so that the balls 6 and ramped grooves 7 interact to urge the pressure plates away from one another.

The friction clutches 8, 9 and the pressure plates 4, 5 are mutually co-axially arranged within a cylindrical housing 11, the clutches 4, 5 being backed, respectively, by annular abutment plates 12, 13, and needle rollers 14, 15. The needle rollers 14 bear against an annular end plate 16 retained by a circlip 17, and the needle rollers 15 bear against a ring 18 which is retained by a circlip 19 through an annular packing-piece 20 and a second annular end-plate 21. In the friction clutches 8, 9 "inner" plates of the sets of interleaved friction plates are splined, respectively, to the shafts 2, 3 and "outer" plates have radial projections 22 (see FIG. 3) received in axially extending slots in cylindrical hollow cage portions 4A, 5A formed integrally with the pressure plates 4, 5. The ring 18 is provided with radial projections 18A which extend through the slots of the cage portion 5A, and which extend also through corresponding slots in the housing 11. Thus, the pressure plate 5 is rotationally in driving connection with the housing 11. The springs 10 are arranged to act in a circumferential direction and lie against the outer surface of the casing 11. One end of each spring 10 is anchored to the housing 11 by means of radially inwardly projecting lugs 23 on an annular shroud 24 secured to the casing 11, while the other end of each spring 10 is connected to the pressure plate 4 by way of links 25 which project through slots 26 in the housing 11 and engage hooked formations on the radial projections 22 of one of the "outer" plates of the friction clutch 8. Thus, the springs 10, in effect, tend to rotate the pressure plates 4, 5 relatively with respect to one another in one relative direction, namely that in which the balls 6 and ramped grooved 7 interact to move the pressure plates away from one another and so pre-load the friction clutches 8, 9 thus ensuring sensitivity of the pressure plates 4, 5 to the relative direction of rotation of the shafts 2, 3 with respect to one another.

Operation of the overrunninG clutch as so-far described will now be explained with reference to FIG.

1 in which parts corresponding to those of FIGS. 2 and 3 are given the same reference numerals as are used in relation to FIGS. 2 and 3.

In FIG. 1, ignoring for the moment the broken outlines, it may be seen that when both the driving and driven shafts 2 and 3 are rotating anti-clockwise, as viewed from the left hand side of FIG. 1, the driven shaft 3 can overrun the driving shaft 2, during which overrun slip occurs in the friction clutch 9, both friction clutches 8, 9 being only relatively lightly pre-loaded by the springs 10, Immediately the rotational speed of the driven shaft 3 tends to drop below that of the driving shaft 2, the pressure plates 4, 5 will tend to be moved away from one another by interaction of the balls 6 and ramped grooves 7 and so increase the torsional capacity of the friction clutches, 8 9 that the coupling will "lock-" and so establish a driving connection between the two shafts. Similarly, if a rotational oscillating or indixing movement is applied to the shaft 2, the shaft will be turned by the shaft 2 only on every alternate "stroke," that is only by every "stroke" in an anti-clockwise direction. Under these, and under all other operating conditions of the overrunning clutch, the springs 10 maintain a pre-loading force on the friction clutches. In addition, because of the manner in which the springs 10 are arranged, it will be appreciated that the pressure plates 4, 5 are biassed so that they tend at all times to adopt a position with respect to one another such that any lost-motion in the ball-and-ramp arrangement is kept to a minimum. This is advantageous in that the sensitivity of the overrunning clutch is maintained at an optimum and in that any wear which might occur between elements of the friction clutches 8, 9 is automatically compensated by virtue of the springs 10 continually adjusting the rotational positioning of the pressure plates with respect to one another so that the balls 6 are never allowed to lie slackly in the groves 7. A further advantage is derived from the fact that the springs 10, being relatively long, may have a relatively low rate with the result that the value of pre-loading force applied to the friction clutches 8, 9 may be maintained within close tolerances despite any wear which may occur.

Figure 7:
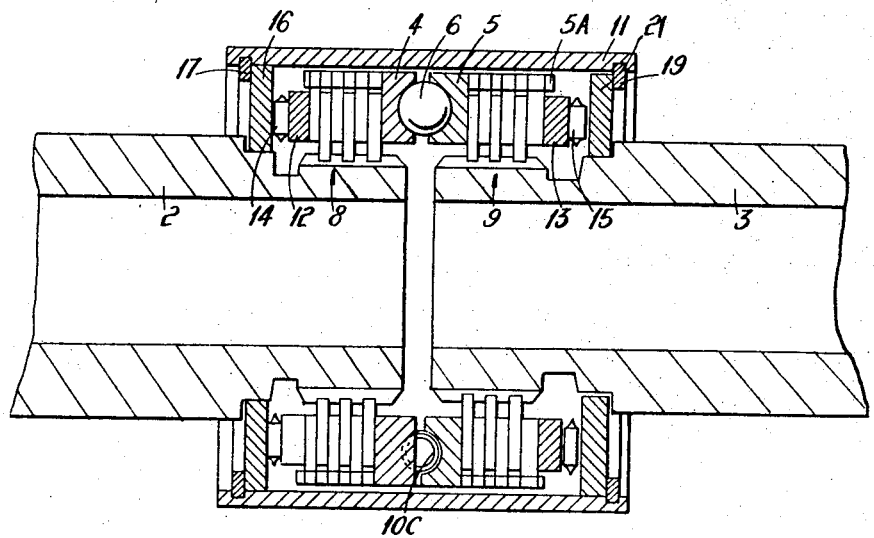

Considering now the broken outlines in FIG. 1 and 2, these illustrate a modification wherein a one-way brake is provided for the purpose of controlling rotational movement of the pressure plate 5. In FIG. 2, the one-way brake is in the form of a sprag clutch 27 interposed between an extension 11A of the housing 11 and a collar 28 adapted to be held stationary or "earthed" with respect to, for example, a fixed casing of part of a vehicle transmission. The spring clutch 27 permits the housing 11 to rotate only in the anti-clockwise direction and this arrangement renders the pressure plate 5 non-sensitive to overrun of the shaft 3 when both shafts are rotating clockwise, thus the shaft 3 may overrun the shaft 2 in both directions of rotation. In this connection, reference is made to our British Pat. No. 1,185,043 wherein the operation and application of a coupling similar to the above-described modification is described in greater detail. In comparing the coupling proposed herein with the overrunning clutch proposed in the last-mentioned reference, it will be noted that the springs 10 replace the compression springs 21 of FIG. 2 of the reference, and that they also replace springs 28 of FIG. 7 of the reference.

The last-mentioned replacement is further explained with reference to the present FIG. 4, in which parts corresponding to those in FIG. 1 are given the reference numerals used in FIG. 1. Here, on one side, the radial projections 18A, and the co-operating sides of the slots in the cage portion 5A are shaped to form mutually co-operable ramp faces 5B and 18B which produce a leftward thrust on pressure plate 5 when the pressure plate 5 rotates or tends to rotate in a clockwise direction. This leftward thrust reduces the torsional capacity of the friction clutch 9 and so enables the shaft 3 to rotate clockwise under certain conditions. This is explained more fully in our British Pat. No. 1,185,043 wherein is also explained the desirability of incorporating a spring arranged to separate the ramp faces 5B and 18B promptly. In the present case, the springs 10 achieve the desired separation of the ramp faces 5B and 18B since one end of each spring 10 is anchored to the casing 11 and therefore acts on the outermost portions of the projections 18A, while the other end of each spring 10 acts on the pressure plate 5, and therefore on the cage 5A, by way of the balls 6 and ramped grooves 7.

Figure 4:
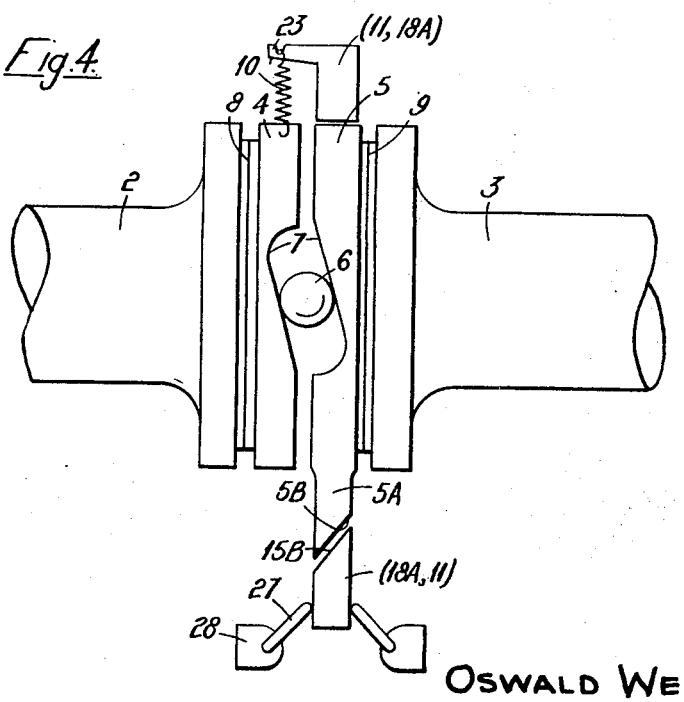
FIG. 4 is a diagrammatic representation of an overrunning clutch corresponding with that illustrated in FIG. 4 of our British Pat. No. 1,185,043, but modified in accordance with the present invention.
Figure 5:
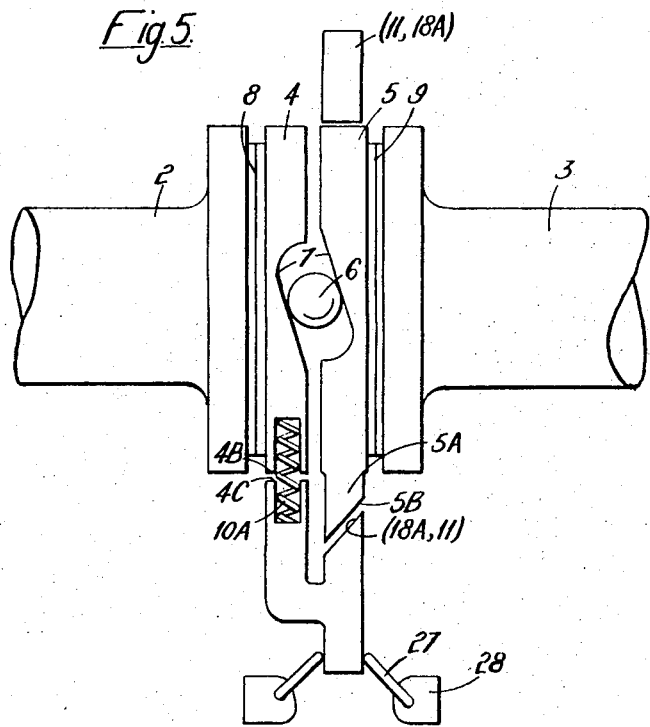
FIG. 5 is a diagrammatic representation of aN overrunning clutch corresponding with that illustrated in FIGS. 1, 4 and 5 of our British Pat. 1,236,981, but modified in accordance with the resent invention.

FIG. 5 illustrates a further modification wherein, in addition to the provision of a one-way brake and ramp faces, there are also provided mutually co-operable stops on the pressure plate 4 and on the running member of the brake respectively for the purpose set forth in our British Pat. No. 1,236,981, namely, in brief, for the principal purpose of limiting the effect of the ramp faces 5B and 18B increasing the torsional capacity of the friction clutch 8. In FIG. 5, parts corresponding to those in FIG. 1 and 4 are given the reference numerals used in FIG. 1 and 4, and the mentioned mutually co-operable stops are indicated at 4B and 4C, these serving to prevent clockwise rotation of the pressure plate 4 by virtue of the one-way brake 27.

In FIG. 5, the tension springs 10 are replaced by compression springs 10A (only one of which is represented in FIG. 5), the latter serving the same purpose as the springs 10 in FIG. 4, namely to pre-load the friction clutches 8 and 9 and to urge the ramp faces 5B and 18B apart.

Figure 6:
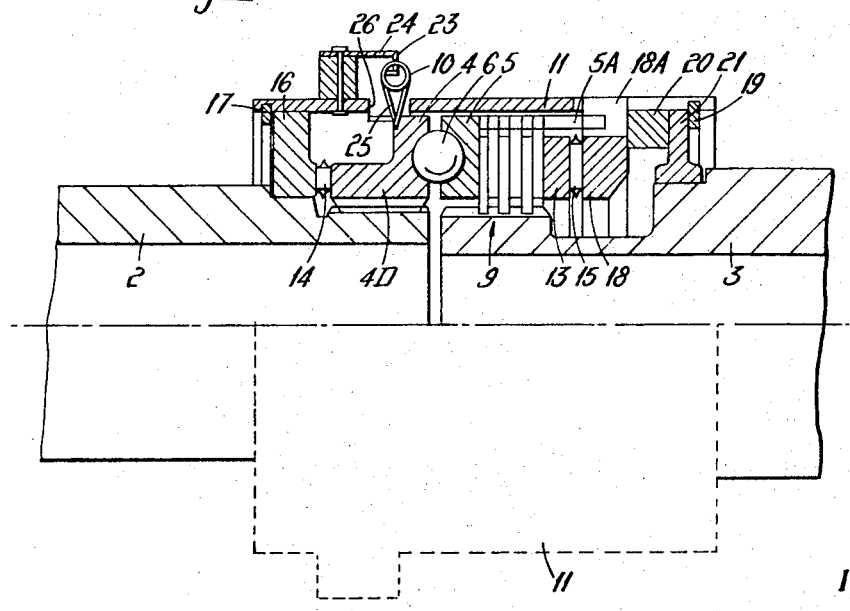
FIG. 6 is a part-sectional side elevation similar to FIG. 2, but including a modification.

FIG. 6 illustrates yet a further modification of the overrunning clutch described with reference to FIGS. 2, and 3, and parts corresponding to those in FIGS. 2 and 3 are given the reference numerals used in FIGS. 2 and 3. Here, only one friction clutch is employed, namely the friction clutch 9. The pressure plate 4 is splined directly to the shaft 2 by way of an internally splined collar portion 4D which also bears directly on the needle rollers 14. The springs 10 are attached directly to the pressure plate 4. Apart from these changes, the construction and operation of the overrunning clutch of FIG. 6 is the same as has been described with reference to FIGS. 2 and 3.

In the overrunning clutches herein described with reference to FIGS. 2, 3 and 6, the provision of the ring 18 is principally for the purpose of making possible the modifications described with reference to FIGS. 1, 4 and 5 in that the projections 18A provide a convenient means of achieving interconnection between the pressure plate 5 and the casing 11.

In the foregoing and in the appended claims, it is to be understood that, in reference to rotatable driving and driven members, the words "driving" and "driven" are used conveniently to distinguish between the rotatable members concerned and are to be interpreted in a manner clearly comprehended in the proposals described and imported by specific reference. For example, it is to be understood that an overrunning clutch in accordance with the present invention permits both members to be "driven" at different speeds.

We claim:

1. An overrunning clutch comprising rotatable driving and driven members, drive means operatively interposed between the driving and driven members, the said means including a first pressure plate, connecting means for establishing a driving connection between the driving member and the first pressure plate, a shiftable second pressure plate, a friction clutch of variable torsional capacity between the driven member and the shiftable pressure plate for establishing a driving connection between the driven member and the shiftable pressure plate, the said pressure plates having mutually co-operable camming means thereon for forcing the pressure plates apart and consequently increasing torsional capacity of the friction clutch when the driving and driven members and consequently the pressure plates tend to rotate relatively with respect to one another in one relative direction, a casing surrounding the said drive means and rotatable about the axis of the overrunning clutch, second connecting means placing the casing in driving connection with the shiftable pressure plate, and a spring acting on the pressure plates so as to tend to rotate the plates relatively with respect to one another in the said one relative direction, said spring having one end thereof connected to the first pressure plate and the other end thereof anchored to the casing.

2. An overrunning clutch according to claim 1, wherein the said spring is a tension spring arranged circumferentially with respect to the rotational axis of the overrunning clutch externally of the said casing, and said one end of the spring is connected to the first pressure plate though means defining an aperture in said casing.

3. An overrunning clutch according to claim 2 including a brake having a one-way running member in driving connection with the shiftable pressure plate for positively preventing rotation of the shiftable pressure plate in one direction of rotation.

4. An overrunning clutch according to claim 3 including mutually co-operable stops on the one-way running member and on the first pressure plate respectively, the stops being arranged so as to limit rotation of the first pressure plate in a direction or rotation opposed to the running direction of rotation of the one-way running member.

5. An overrunning clutch according to claim 4, wherein the said one-way running member is drivingly connected to the casing, and the said second connecting means incorporates mutually co-operable ramp faces so arranged that they react to thrust the shiftable second pressure plate in a direction away from the friction clutch to permit slip in the friction clutch when the siftable second pressure plate tends to rotate in a direction of rotation opposed to the running direction of rotation of the one-way running member.

6. An overrunning clutch according to claim 5, wherein the first pressure plate is a shiftable pressure plate, and the said connecting means for establishing a driving connection between the driving member and the first pressure plate is a friction clutch of variable torsional capacity responsive to action of the said camming means.

* * * * *